(12) United States Patent
Winiecki et al.

(10) Patent No.: US 11,557,843 B2
(45) Date of Patent: Jan. 17, 2023

(54) PHASED ARRAY ANTENNA SYSTEM

(71) Applicant: Sequans Communications SA, Colombes (FR)

(72) Inventors: Thomas Winiecki, Reading (GB); Riadh Berhouma Ghandri, La Ferté-sous-Jouarre (FR)

(73) Assignee: Sequans Communications SA, Colombes (FR)

( * ) Notice: Subject to any disclaimer, the term of this patent is extended or adjusted under 35 U.S.C. 154(b) by 67 days.

(21) Appl. No.: 17/317,172

(22) Filed: May 11, 2021

(65) Prior Publication Data
US 2022/0368027 A1  Nov. 17, 2022

(51) Int. Cl.
*H01Q 1/24*  (2006.01)
*H01Q 21/06*  (2006.01)
*H01Q 5/371*  (2015.01)
*H01Q 1/22*  (2006.01)
*H04B 1/3805*  (2015.01)
*H01Q 9/04*  (2006.01)

(52) U.S. Cl.
CPC ......... *H01Q 21/065* (2013.01); *H01Q 1/2283* (2013.01); *H01Q 5/371* (2015.01); *H01Q 9/045* (2013.01); *H04B 1/3805* (2013.01); *H04B 2001/3811* (2013.01)

(58) Field of Classification Search
CPC .... H01Q 21/065; H01Q 1/2283; H01Q 5/371; H01Q 9/045; H04B 1/3805
See application file for complete search history.

(56) References Cited

U.S. PATENT DOCUMENTS

2016/0308563 A1*  10/2016  Ouyang ............... H01Q 21/062

* cited by examiner

*Primary Examiner* — Dieu Hien T Duong
(74) *Attorney, Agent, or Firm* — One LLP (57) ABSTRACT

Disclosed herein is a phased array antenna system that includes: a first array of antenna elements having a first and second antenna element; a second array of antenna elements having a third and fourth antenna element; a beamforming integrated circuit (IC) coupled to the first and second arrays; and a set of transmission lines coupling the beamforming IC to the first and second arrays. The first and second arrays are parallel to and facing in opposite directions of each other. The set of transmission lines is configured to delay radio frequency (RF) signals from the beamforming IC to first and third antenna elements.

19 Claims, 10 Drawing Sheets

PHASED ARRAY ANTENNA SYSTEM

TECHNICAL FIELD

The disclosure relates generally to the field of antenna, specifically and not by way of limitation, some embodiments are phased array antenna.

BACKGROUND

With the introduction of frequency bands above 24 GHz in the 5th generation of cellular standards (5G) defined by the 3rd Generation Partnership Project (3GPP), phased array antennas are becoming a widespread technology across many devices, such as smartphones, mobile routers, and fixed wireless access terminals. Similar communication protocols, known as WiGig (IEEE 802.11ad, 802.11ay) and WirelessHD, have been defined for the 60 GHz unlicensed spectrum. Devices based on these standards also rely heavily on phased array antennas.

A phased array antenna, as the name implies, is an array of antenna elements. Each array can have two or more antenna elements placed adjacent to each other. Each individual antenna element has substantially the same radiation pattern. However, the array can have a combined (main) radiation pattern, that is substantially different is from the radiation pattern of each individual antenna element. The antenna elements of each array can also be electronically phase-controlled (e.g., changing the phase of radio frequency (RF) signals inputted to the antenna elements). Typically the phases are arranged such that signals transmitted from each element constructively interfere and sum up in amplitude for a desired direction. This is called analog beam forming and the direction in which constructive interference occurs, is referred to as the main lobe. A well-arranged antenna array can radiate the most energy in the main lobe while radiating a minimum amount of energy in the side and/or back lobes. Electromagnetic waves incoming from a certain direction will couple to each element. When using a suitable set of programmable phase shifts on each element, these individual signals can be summed coherently to maximize receiver gain from the direction of the main lobe.

In conventional phased array antenna systems, one would need to use many antenna elements and/or multiple beamforming ICs in order to change the radiation pattern. However, using many antenna elements and beamforming ICs will greatly increase the footprint of the system and the cost. Accordingly, what is needed is a phased array antenna system that can change the shape and/or direction of the radiation pattern without increasing the circuit footprint and cost.

SUMMARY

Disclosed are phased array antenna systems. One of the antenna systems includes: a first array of antenna elements having a first and second antenna element; a second array of antenna elements having a third and fourth antenna element, a beamforming integrated circuit (IC) coupled to the first and second arrays; and a set of transmission lines coupling the beamforming IC to the first and second arrays. The first and second arrays can be parallel to and facing in opposite directions of each other. The set of transmission lines is designed and made to delay radio frequency (RF) signals from the beamforming IC to first and third antenna elements with respect to RF signals from the beamforming IC to the second and fourth antenna elements.

The set of transmission lines can include a first, second, third, and fourth transmission lines. The first and second transmission lines are coupled to the first and second antenna elements, respectively. The third and fourth transmission lines are coupled to the third and fourth antenna elements, respectively. The first and third transmission lines can be longer than the second and fourth transmission lines, respectively. The first and third transmission lines can have the same length. Alternatively, the first transmission line can be longer than the third transmission line.

The antenna system can also include a first RF splitter that couples the beamforming IC to the first and second transmission lines. The first RF splitter can also couple the beamforming IC to the third and fourth transmission lines. In some embodiments, the antenna system includes a second RF splitter that couples the beamforming IC to the third and fourth transmission lines.

The antenna system can also include a substrate having a first and second opposing surface. The first and second arrays are parallelly coupled to the first and second surfaces, respectively. The beamforming IC is coupled to the first or second surface of the substrate. The beamforming IC can be centered on a midline or a center point of both the first and second arrays.

The antenna system can be a part of a router. The first and second arrays can be mounted within the router such that each of the first and second array is substantially vertical with respect to the horizontal plane of the ground (earth) when the router is mounted.

Also disclosed is a router that includes: a first array of antenna elements mounted to a substrate, the first array having a first and second antenna element; a second array of antenna elements mounted to an opposite side of the substrate, the second array having a third and fourth antenna element; a beamforming integrated circuit (IC) coupled to the first and second arrays; and a set of transmission lines coupling the beamforming IC to the first and second arrays. The set of transmission lines can be routed such that the main lobes of radiation patterns of the first and second arrays are skewed in a direction that is not parallel to a normal radiation vector of the first and second arrays. Additionally, the first and second arrays are parallel to and facing in opposite directions of each other.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

The antenna system may also be integrated in the monitor panel of a laptop. The first array of antenna elements faces the direction in front of the screen and the second array of antenna elements faces the direction behind the screen.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

The principle of phased array antennas has been known for more than 100 years, but today's solutions remain technically challenging and their cost relatively high. One key drawback of practical phased array antenna implementations is that they can transmit and receive signals only into or from the hemisphere that the antenna elements are pointing towards. The hemisphere behind the array cannot be accessed.

The phased array antenna system, as disclosed herein, has a unique arrangement to create a double-sided phased array without the need to duplicate most of the costly components as would otherwise require by conventional phased array antenna systems. The new and improved phased array antenna system (hereinafter simply "the phased array antenna system" or "antenna system") can be configured to have different radiation patterns and can be optimized for various applications. In some embodiments, the radiation pattern of the phased array antenna system can be optimized for use in smartphone and mobile routers.

Conventional phased array antennas in currently available smartphone and mobile routers are capable of transmitting and receiving in cellular frequency bands between 24 GHz and 40 GHz. These conventional phased array antennas cover at most half of the full sphere around them. In order to access different directions, multiple arrays are installed. For example, in a typical smartphone application, four antennas are fitted, two pointing forward through the screen of the smartphone, and two pointing into the opposite direction.

Mobile routers are type of devices that transmit and receive cellular signals and relay them to WLAN signals. Mobile routers typically have two arrays that are fitted and arranged such that they face into predominantly opposite directions. Because these devices are often placed on a tabletop or the ground, the antennas are installed at an angle so that the center of the resulting beam (e.g., main lobe) is not angled toward the surface of the tabletop or ground, which will cause most of the energy to be absorbed by the surface.

Figure 1:
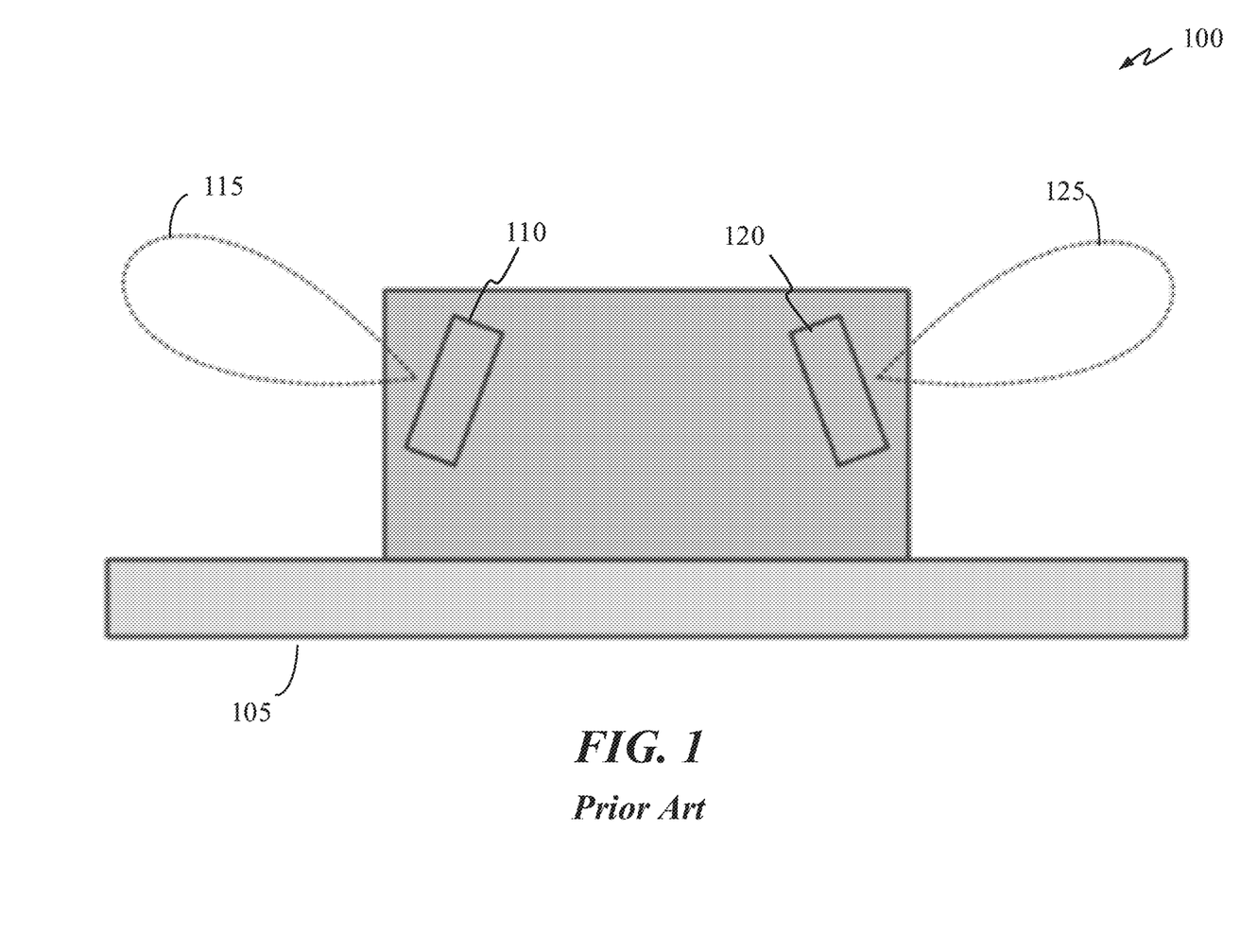
FIG. 1 illustrates a conventional router.

FIG. 1 illustrates a conventional mobile router 100 placed on a surface 105. Router 100 includes phased array antenna 110 and 120, both of which are angled upward. This physically forces the planar surface of each array to be pointed toward the sky and away from surface 105. As a result, the main lobe of arrays 110 and 120 are pointed toward the sky where the radiation could spread farther without interference from various objects near the ground (e.g., surface 105).

As mentioned, routers operates in high frequencies between 24 GHz and 40 GHz. At this frequency range, significant signal losses can occur even along transmission routes of just a few millimeters in length. This remains true even if PCB material with low dielectric losses is used. Consequently, most architectures use a lower intermediate frequency for communication with a signal processing unit and the relatively distant antenna module. Inside the antenna module, the intermediate frequency is up or down converted into the desired carrier frequency using a suitable up or down conversion mixer. This mixer requires a clock signal provided from a local phase-locked loop (PLL).

In the transmit direction, once the signal is at the final carrier frequency, it is split (for instance using a passive Wilkinson splitter) and each copy is delayed by a programmable phase delay, before it is further amplified (by a power amplifier) and coupled onto a resonant antenna element. The resonance is typically created using a driven and a passive copper patch, suitably sized and spaced so that an electromagnetic wave is transmitted away from the plane of the antenna.

In the receive direction, waves coupling onto the resonant patch are converted to electric signal, which are amplified (by a low noise amplifier), delayed in phase by a programmable amount, and then combined at RF frequency, for instance with a Wilkinson combiner circuit.

Low-noise amplifiers (LNAs), power amplifiers (PAs), phase shifters, and other functional blocks are typically assembled in a single integrated circuit (IC) called a beamformer. Because of high routing losses, these components are co-located in a beamforming IC.

Figure 2:
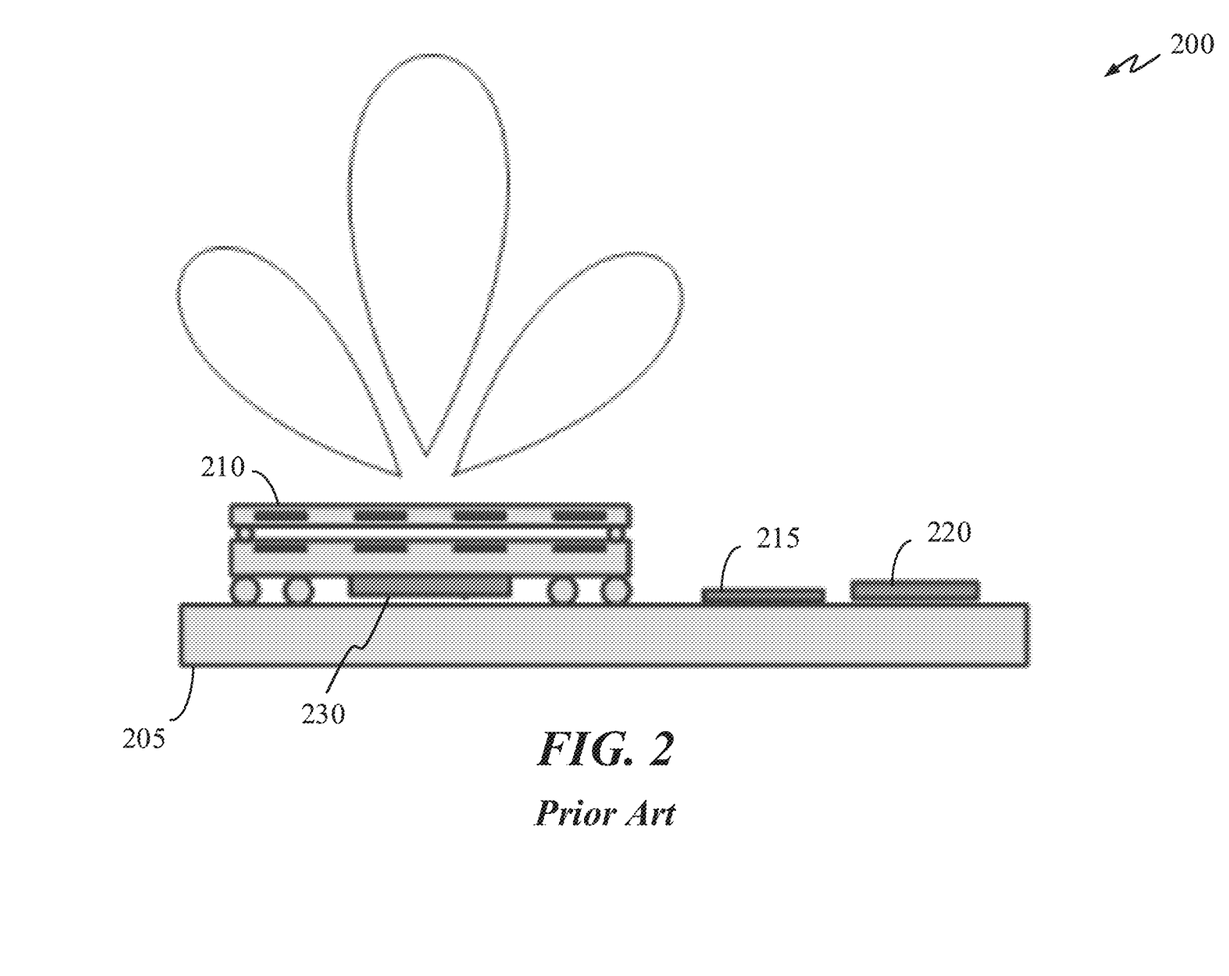
FIG. 2 illustrates a conventional antenna-in-package.

FIG. 2 illustrates a typical mechanical arrangement of an Antenna in Package (AiP) 200, which includes a substrate 205, an antenna array 210 of four antenna elements, power circuit 215, PLL circuit 220, and beamforming IC 230. To create AIP 200, beamforming IC 230 is coupled to antenna array 210 in a first assembly step. Next, the antenna and beamformer assembly is then soldered onto substrate 205, which can be a PCB carrier. Also attached to substrate 205 are power and PLL circuits 215 and 220. To form a large array of antennas, multiple AIP 200 can be arranged side-by-side ('tiled') on the carrier PCB.

Figure 3:
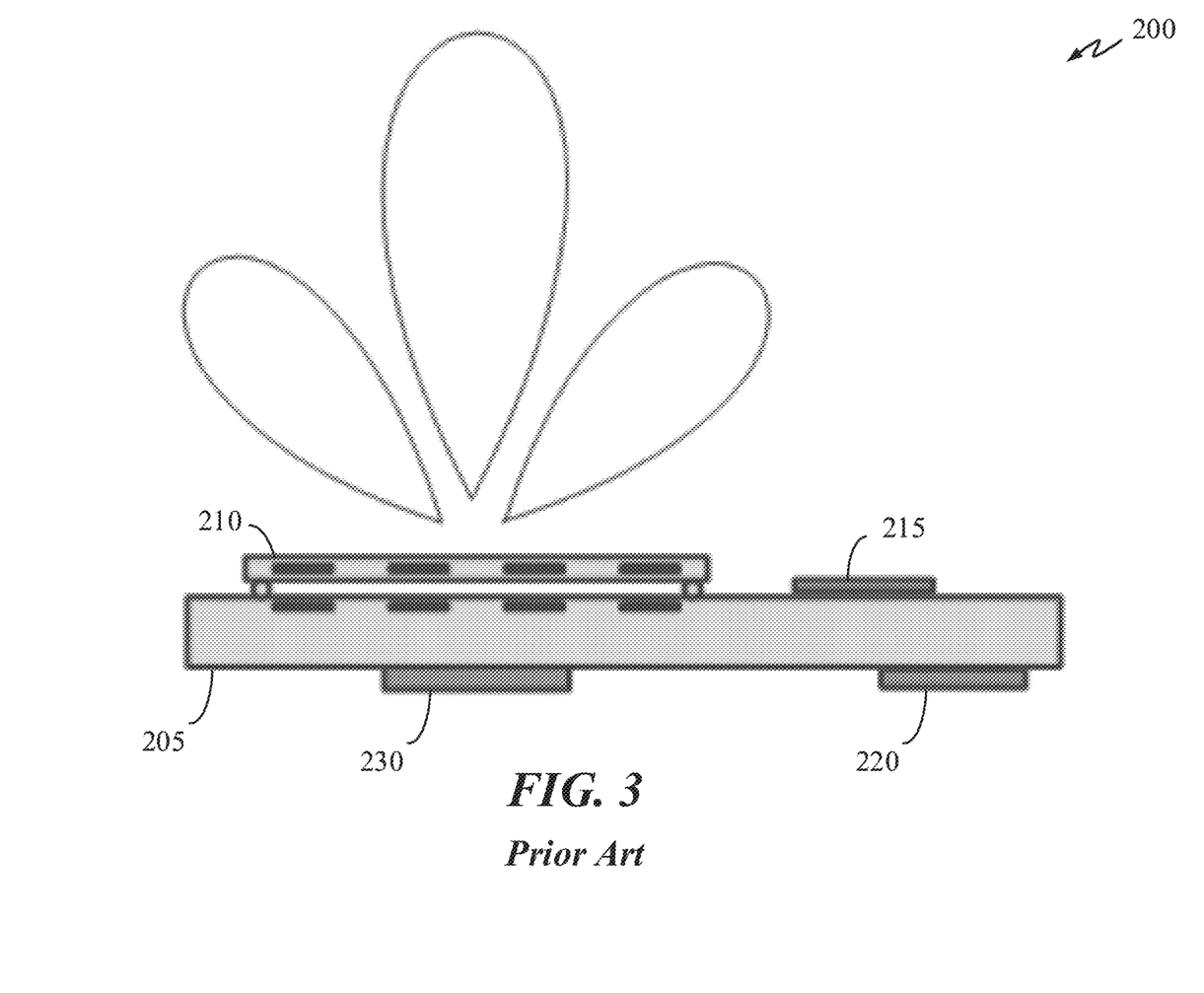
FIG. 3 illustrates another conventional antenna-in-package.

FIG. 3 illustrates a conventional AIP 300 where antenna array 210 and beamforming IC 230 are coupled to opposite sides of substrate 205. Power and PLL circuits 215 and 220 can be coupled on the same side or opposite sides of substrate 205. In this particular configuration, RF signals are routed between beamforming IC 230 and antenna array 210 through substrate 205, which needs to be constructed of a material with low dielectric losses.

Double-Sided Phased Array Antenna

Figure 4:
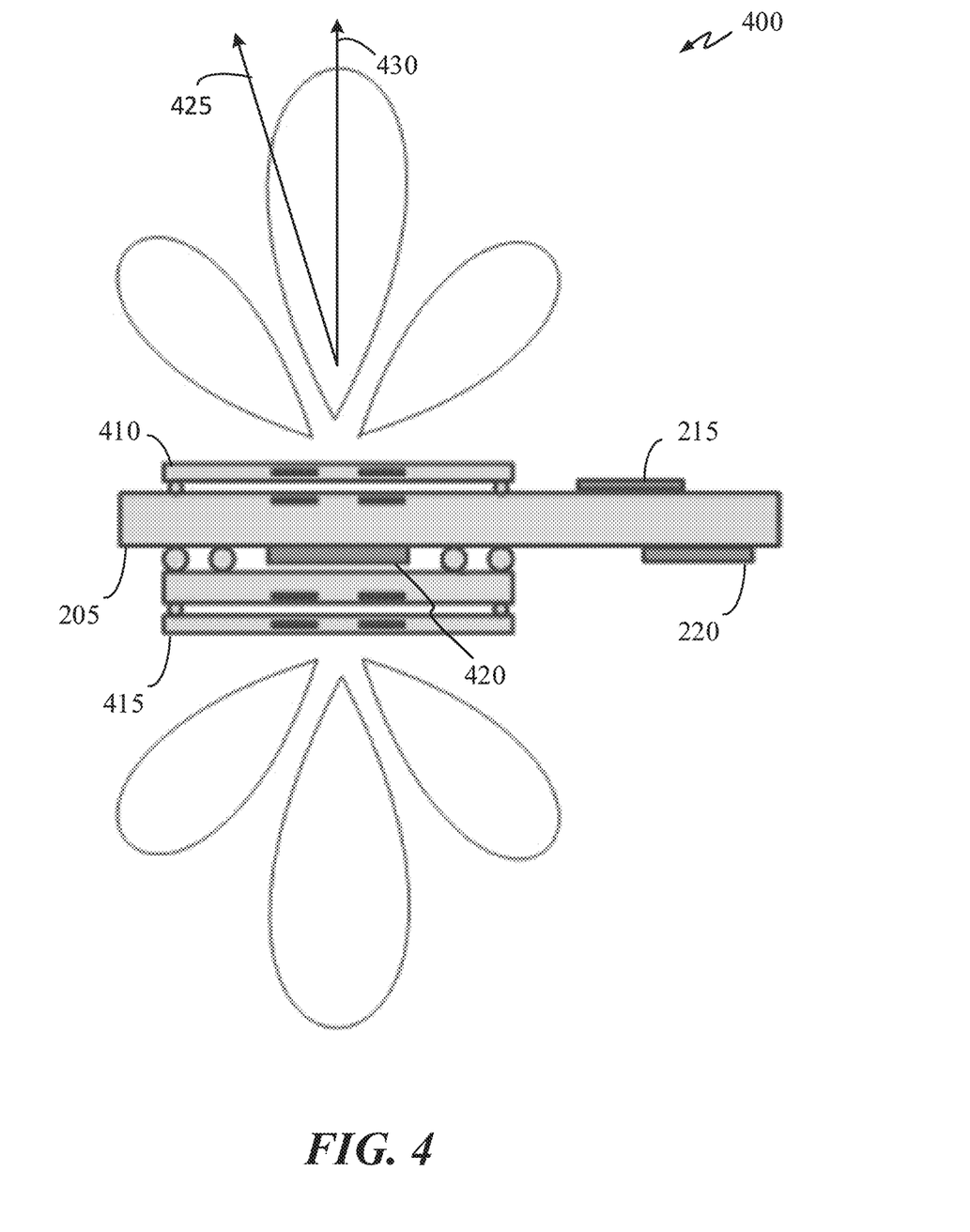
FIG. 4 illustrates an antenna-in-package (AIP) in accordance with some embodiments of the present disclosure.

FIG. 4 illustrates an AIP 400 having a double-sided array of antennas in accordance with some embodiments of the present disclosure. AIP 400 includes substrate 205, power circuit 215, PLL circuit 220, antenna arrays 410 and 415, and beamforming IC 420. In some embodiments, each of antenna arrays 410 and 415 can have two or more antenna elements. In one embodiment, each antenna array includes two antenna elements, each element is configured to receive signals from two RF channels of beamforming IC 420. As mentioned, each antenna element receives two RF channels, one for each polarization modality. Consequently, four RF channels are dedicated to each of antenna array 410 and 415.

As shown in FIG. 4, the radiation pattern of the double-sided array is uniform on both sides of substrate 205. However, conventional beamforming ICs do not support switching between different signal paths. Although AIP 400 has two separate antenna arrays, only one beamforming IC 420 is used. Accordingly, assuming that beamforming IC 420 has 8 RF channels to support the four antenna elements, then just two channels are available for each of the antenna elements of arrays 410, 415.

Additionally, since there are only two antenna elements on each antenna array, the ability to electronically beam steer the radiation pattern is reduced without further improvement over conventional architecture such as in AIP 200. The reduced antenna element count per side in AIP 400 as compared to the single-sided AIP 200, which has four antenna elements, lowers the AIP 400 ability to be steered electronically. With only half the number of elements available, each half will suffer a 3 dB loss in receiver equivalent isotropic sensitivity (EIS) and a 6 dB loss in transmit effective isotropic radiated power (EIRP). The latter is due to a drop of total radiated power (TRP) by 3 dB compounded with a reduction of antenna directivity with 3 dB.

However, AIP 400 includes novel and innovative improvements over AIP 200 that are not readily apparent. AIP 400 can be configured to adjust the radiation pattern in a desirable direction such as for example in direction 425. In some embodiments, AIP 400 does not used an electronic phase delaying module to steer the radiation pattern. Instead, AIP 400 uses a unique transmission line design (not shown) that is configured to generate a radiation pattern with the main lobe pointed in a desired angle with respect to the normal direction 430 as shown in FIG. 4. More discussion of the set of transmission line is provided below with respect to FIGS. 8 and 9.

Figure 5:
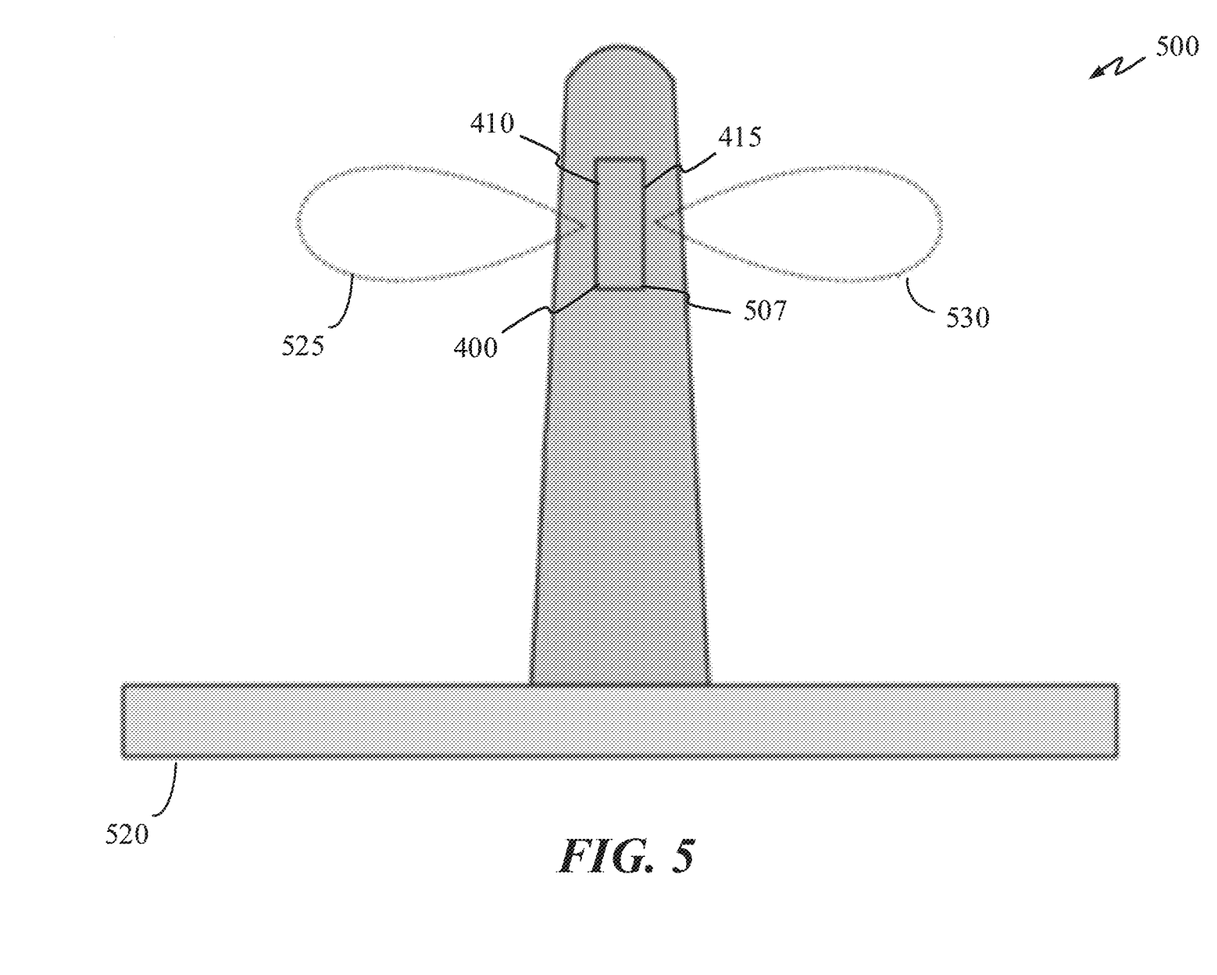
FIG. 5 illustrates a router in accordance with some embodiments of the present disclosure.

Before going into the detail of the improvements, it might be useful to discuss one of the specific applications for the double-sided phased array antenna. It should be noted that there are many other applications even though one specific application is discussed below. FIG. 5 illustrates a mobile router 500 with a double-sided phased array antenna similar to AIP 400 but without the unique transmission line design configured to focus the radiation pattern in a specific direction. It should be noted that router 500 is a hypothetical router conjured to better illustrate the improvements and novelty of AIP 400 (which will be further discussed below). Router 500 is not an admitted prior art as it is conceptualized here for the purpose of this discussion. As shown in FIG. 5, router 500 includes an antenna assembly 505 and antenna arrays 510 and 515, both of which are mounted in parallel and on a single substrate 507.

Because both antenna arrays 510 and 515 are mounted on the same substrate (opposing side) and that substrate 507 is mounted vertically with respect to base 520 of router 500, antenna arrays 510 and 515 cannot be angled similar to antenna arrays 110 and 120. In router 500, arrays 510 and 515 are mounted in parallel of each other and vertical to the ground. In this way, that radiation patterns 525 and 530 would extend outward and parallel to the ground or base 520. The radiation patterns of antenna array 525 and 530 would resemble lobes 525 and 5530, which are opposite in direction and parallel to each other.

Figure 6A:
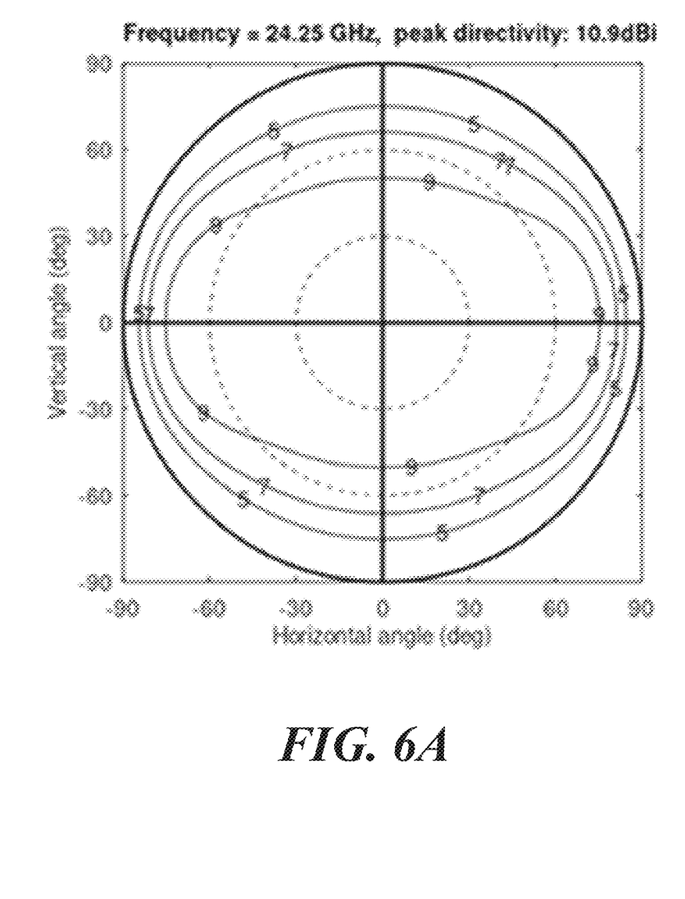
FIG. 6A illustrates a radiation plot of a conventional 4×1 antenna array operating at 24.25 GHz.
Figure 6B:
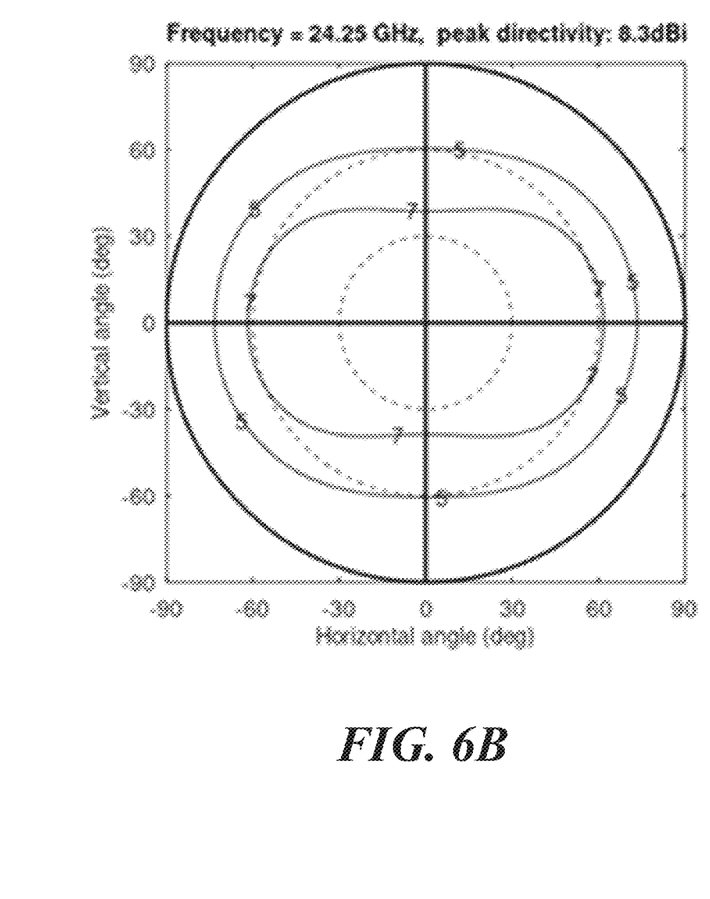
FIG. 6B illustrates a radiation plot of a conventional 2×1 antenna array operating at 24.25 GHz.
Figure 7A:
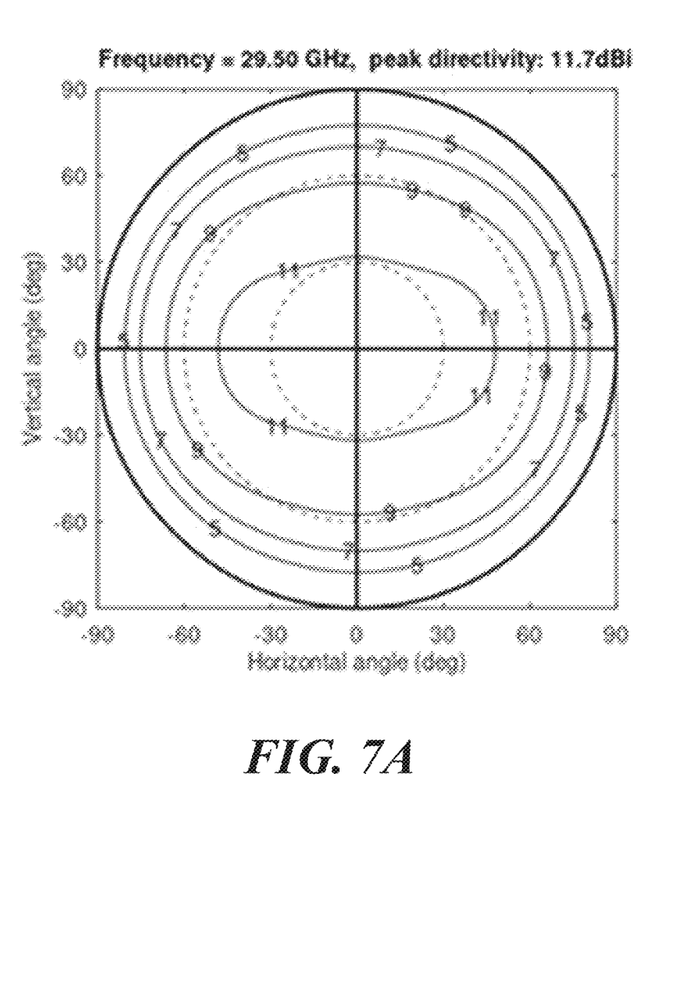
FIG. 7A illustrates a radiation plot of a conventional 4×1 antenna array operating at 29.5 GHz.

However, as shown in FIG. 4, each antenna array of AIP 400 only has two antenna elements instead of four. This effectively cuts the power output in half. FIGS. 6A-B and 7A-B are antenna radiation plots. FIGS. 6A and 6B illustrate radiation patterns of a 4×1 and a 2×1 antenna array, respectively. In FIG. 6A, the peak directivity of a 4×1 array is 10.9 dBi at 24.25 GHz. At the same frequency, the peak directivity of a 2×1 array is 8.3 dBi. This is a 2.6 dB drop, which is almost half the loss in power. In FIG. 7A, the peak directivity of a 4×1 array is 11.7 dBi at 29.50 GHz. At the same frequency, the peak directivity of a 2×1 array is 8.8 dBi. This is a 2.9 dB drop. Accordingly, when the number of antenna elements drops from 4 to 2 elements the gain of the antenna drops by half. Additionally, as shown in all four plots (FIGS. 6A, 6B, 7A, and 7B), the radiation pattern is uniform on both sides of the horizontal line at zero degree. This is because the elements are pointed perpendicular plane of the antenna array.

For the mobile router application, it is desirable to have a single antenna module that can provide coverage in opposite directions while using the least amount of antenna elements and beamforming IC. To achieve this, two antenna arrays 510 and 515 are mounted to the opposite sides of substrate 507 in an upright position as shown in FIG. 5. With this design, the antenna arrays are mounted in parallel to each other. This type of placement also allows RF signals to flow in both directions unimpeded. However, in order to incorporate AIP 400 into router 500 (which has only one beamforming IC) each antenna array can only have two antenna elements. In other words, each antenna array has 2×1 array architecture so that two antenna arrays can be mounted opposite of each other on the same substrate. The 2×1 array is mounted vertically—perpendicular to base 520. With a total of only 4 antenna elements, AIP 400 can be controlled using a single 8-channel beamforming IC.

Figure 7B:
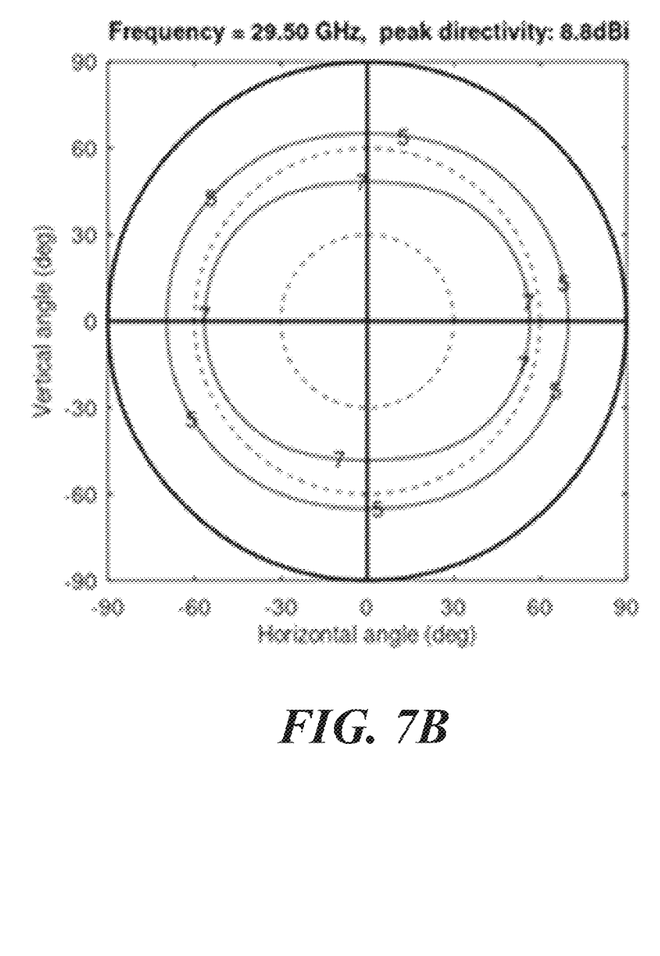
FIG. 7B illustrates a radiation plot of a conventional 2×1 antenna array operating at 29.5 GHz.

As previously mentioned, all currently available beamforming ICs are designed to serve a minimum of four antenna elements. Each antenna element can have two dedicated RF channels to enable polarization in two directions. This enables AIP 400 to be controlled using a single 8-channel beamforming IC. But switches in current beamforming ICs are not designed to manage two separate antenna arrays, each with only two antenna elements. Such switches would cause additional insertion loss and also increase the size and cost of the beamforming IC. Additionally, since there is half the number of antenna elements on each side, only half the number of RF channels will be available for each side. With only two elements available on each side of antenna, the antenna directivity is reduced and the receive and transmit performance is degraded as shown in FIGS. 6B and 7B.

Further, in router 500, two oppositely facing antenna arrays are mounted on a single substrate. This means both opposing arrays are parallel to each other and cannot be installed at an angle as in mobile router 100. In other words, by design, each antenna array must be vertically disposed within the router so that the radiation pattern extends outward and parallel to the ground. But to increase transmission and reception range, the radiation patterns should be steered upward (i.e., above the horizon). Accordingly, it is desirable to control the antenna elements so that their main lobes are pointed upward (i.e., away from base 520). A common way to do this is to adjust the phase of the RF signals of the antenna elements. However, it is not possible to electronically steer the beam upwards above the horizon through phase adjustment as many more antenna elements are required to effectively steer the radiation pattern.

To solve the above issue, AIP 400 can use at least two rows of antenna elements for each array. In other words, AIP 400 can include a 2×1 array arranged vertically. Both antenna elements in the 2×1 array are connected to the same RF path from and to the beamformer. Additionally, the transmission lines of AIP 400 is designed to deliberately delay the signals from and to the upper row of antenna elements. This can be achieved by adding extra trace length in the feed line from the point where the signals are split or combined.

Figure 8:
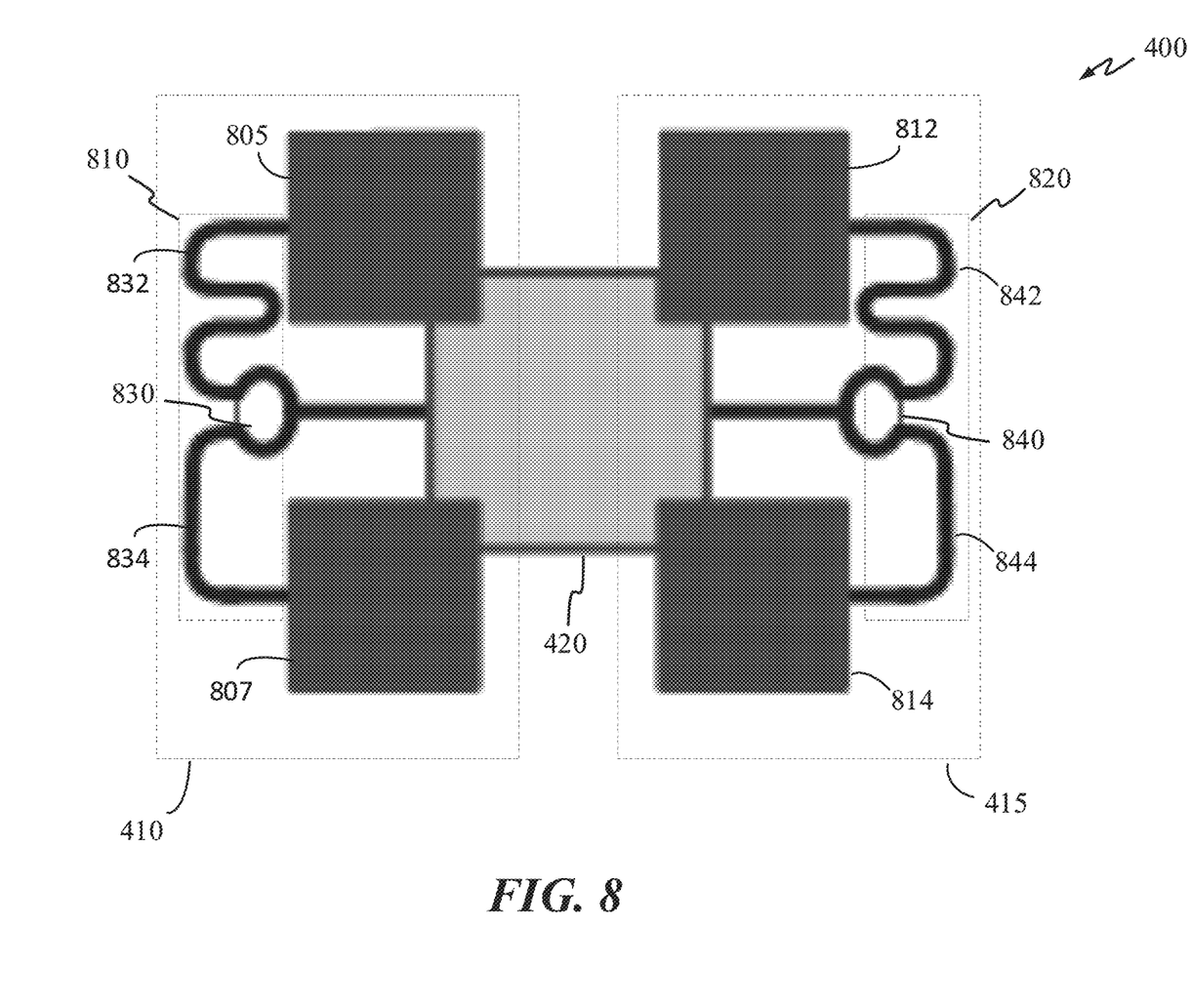
FIG. 8 illustrates an antenna-in-package in accordance with some embodiments of the present disclosure.

FIG. 8 illustrates AIP 400 with a unique tracing design in accordance with some embodiments of the present disclosure. AIP 400 includes antenna arrays 410 and 415, beamforming IC 420, a first set of transmission lines 810, and a second set of transmission lines 820. Antenna array 410 includes antenna elements 805 and 807, both of which are mounted in a vertical direction with respect to the ground or earth. Similarly, Antenna array 415 includes antenna elements 812 and 814. Router 500 can have multiple AIPs 400 placed adjacent to each other—positioned vertically and/or horizontally.

Transmission lines set/unit 810 includes an RF splitter/combiner 830 and transmission lines 832 and 834. Transmission lines set/unit 820 includes an RF splitter/combiner 840 and transmission lines 842 and 844. Transmission line 832 is longer than transmission line 834. Similarly, in transmission unit 820, line 842 is longer than line 844. In this way, RF signals to antenna element 805 from beamforming IC 420 are physically delayed. Similarly, transmission line 842 is longer than transmission line 844, which causes RF signals to be delayed.

The delayed effect causes the main lobe of each of antenna arrays 410 and 415 to be angled away from the horizon. In this case, the effect of the delay causes the main lobes of the radiation pattern to be tilted upward (i.e., away from the base of router 500). In some embodiments, the length of traces 832 and 842 can be adjusted to achieve a range of delays. In this way, the angle of tilt of the main lobes can be controlled during fabrication of AIP 400. In some embodiments, beamformer IC 420 can be placed off-center of arrays 410 and 415 such that the transmission length of traces 832 and 842 naturally differ from traces 834 and 844. The trace length difference can also be different for the first array of elements and the second array facing the opposite side. In other words, trace 832 can be longer than trace 842, which is longer than trace 844. This will tilt the main lobe of antenna 410 more than the main lobe of antenna 815. This type of arrangement can be particularly useful if the router design is not symmetrical or if the phased array is integrated into a laptop screen that is typically positioned at an angle off vertical.

Figure 9:
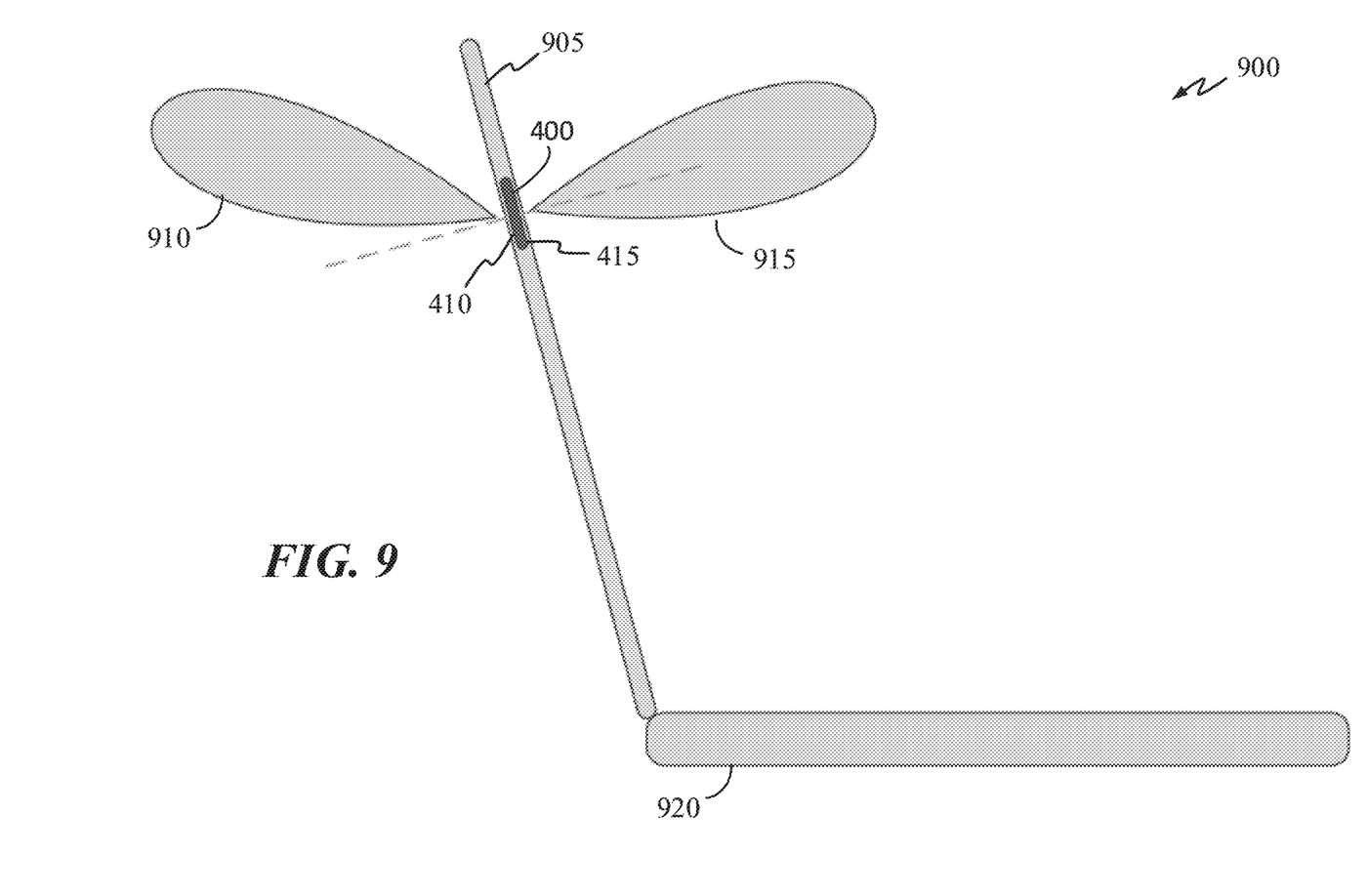
FIG. 9 illustrates a laptop having a new and improved AIP in accordance with some embodiments of the present disclosure.

FIG. 9 illustrates a laptop 900 having AIP 400 in accordance with some embodiments of the present disclosure. As shown, AIP 400 is position within display panel 905 of laptop 900. During operation, AIP 400 will be positioned off vertical as display panel 905 (e.g., screen) is typically angled away from the user. In some embodiments, to make lobes 910 and 915 to have generally the same angle above horizontal or base 920 of laptop 900 when screen 905 is pushed back at a certain angle away from vertical, trace 832 of antenna array 410 is made longer than trace 842 of antenna array 815. Display panel 905 can include the display (e.g., LED, LCD screen) and the frame to which the display is secured.

Figure 10A:
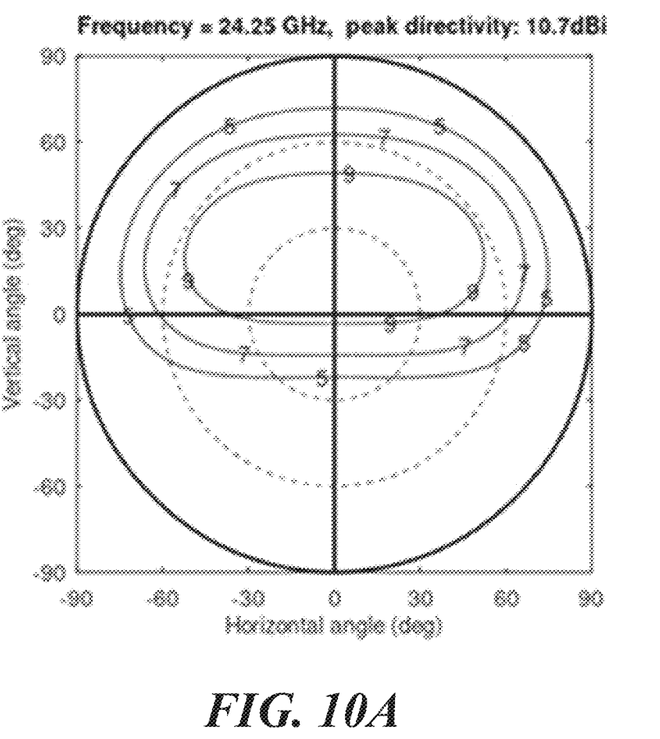
FIG. 10A illustrates a radiation plot of the 2×1 antenna array of the AIP shown in FIG. 8 operating at 24.25 GHz in accordance with some embodiments of the present disclosure.
Figure 10B:
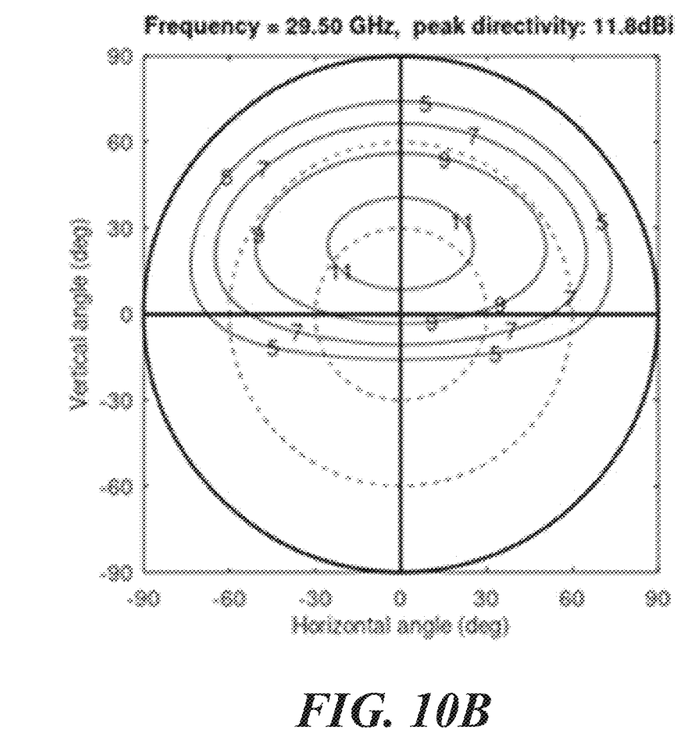
FIG. 10B illustrates a radiation plot of the 2×1 antenna array of the AIP shown in FIG. 8 operating at 29.5 GHz in accordance with some embodiments of the present disclosure.

FIGS. 10A and 10B are radiation plots illustrating the improved radiation patterns of AIP 400. As shown in FIG. 10A, the directivity of the 2×1 antenna array of AIP 400 is 10.7 dBi at 24.25 GHz as compared with 10.9 dBI of a 4×1 conventional antenna array at the same operating frequency. The drop in gain is now negligible. Previously, the drop in gain for a 2×1 array of a conventional AIP is almost 3 dB.

In FIG. 10B, the directivity of the 2×1 antenna array of AIP 400 is 11.9 dBi at 29.5 GHz as compared with 11.7 dBi of a 4×1 conventional antenna array at the same operating frequency. At this frequency, there is a gain in performance rather than a drop of almost 3 dB when a conventional 2×1 antenna array is used. Additionally, the radiation pattern of AIP 400 is now focused upward in the direction of the sky (away from the ground).

Although the above described arrangement is suitable for a mobile router application, other applications are equally applicable to antennas fitted into any other devices that transmit or receive signals from multiple directions.

CONCLUSION

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A phased array antenna system comprising:
a first array of antenna elements having a first and second antenna element;
a second array of antenna elements having a third and fourth antenna element, wherein the first and second arrays are parallel to and facing in opposite directions of each other;
a beamforming integrated circuit (IC) coupled to the first and second arrays; and
a set of transmission lines coupling the beamforming IC to the first and second arrays, wherein the set of transmission lines is configured to delay radio frequency (RF) signals from the beamforming IC to first and third antenna elements with respect to RF signals from the beamforming IC to the second and fourth antenna elements.

2. The phased array antenna system of claim 1, wherein the set of transmission lines comprises a first, second, third, and fourth transmission lines, wherein the first and second transmission lines are coupled to the first and second antenna elements, respectively, and wherein the third and fourth transmission lines are coupled to the third and fourth antenna elements, respectively.

3. The phased array antenna system of claim 2, wherein the first transmission line is longer than the second transmission line, and the third transmission line is longer than the fourth transmission line.

4. The phased array antenna system of claim 2, further comprising a first RF splitter coupling the beamforming IC to the first and second transmission lines.

5. The phased array antenna system of claim 4, wherein the first RF splitter couples the beamforming IC to the third and fourth transmission lines.

6. The phased array antenna system of claim 2, further comprising a second RF splitter coupling the beamforming IC to the third and fourth transmission lines.

7. The phased array antenna system of claim 1, further comprising a substrate having a first and second opposing surface, wherein the first and second arrays are parallelly coupled to the first and second surfaces, respectively, and wherein the beamforming IC is coupled to the first or second surface of the substrate.

8. The phased array antenna system of claim 7, wherein the beamforming IC is centered on a midline of both the first and second arrays.

9. The phased array antenna system of claim 7, wherein phased array antenna system comprises a router, wherein the first and second arrays are mounted within the router such that each of the first and second array is substantially vertical with respect to earth when the router is mounted.

10. The phased array antenna system of claim 7, wherein phased array antenna system is mounted on a display panel of a laptop.

11. A router comprising:
a first array of antenna elements mounted to a substrate, the first array having a first and second antenna element;
a second array of antenna elements mounted to an opposite side of the substrate, the second array having a third and fourth antenna element, wherein the first and second arrays are parallel to and facing in opposite directions of each other;

a beamforming integrated circuit (IC) coupled to the first and second arrays; and a set of transmission lines coupling the beamforming IC to the first and second arrays, wherein the set of transmission lines is routed such that main lobes of radiation patterns of the first and second arrays are skewed in a direction that is not parallel to a normal radiation vector of the first and second arrays.

12. The router of claim 11, wherein the set of transmission lines comprises a first, second, third, and fourth transmission lines, wherein the first and second transmission lines are coupled to the first and second antenna elements, respectively, and wherein the third and fourth transmission lines are coupled to the third and fourth antenna elements, respectively.

13. The router of claim 12, wherein the first and third transmission line have the same length and are longer than the second and fourth transmission lines.

14. The router of claim 12, further comprising a first RF splitter coupling the beamforming IC to the first and second transmission lines.

15. The router of claim 14, further comprising a second RF splitter coupling the beamforming IC to the third and fourth transmission lines.

16. The router of claim 12, wherein the beamforming IC is coupled to the substrate.

17. The router of claim 12, wherein the beamforming IC is centered on a midline of both the first and second arrays.

18. The router of claim 11, wherein the first and second arrays are mounted within the router such that each of the first and second array is substantially perpendicular to a horizontal plane of ground when the router is mounted.

19. The router of claim 11, wherein the beamforming IC have eight RF channels, two RF channels for each antenna element.

* * * * *